US006422374B1

United States Patent
West

(10) Patent No.: US 6,422,374 B1
(45) Date of Patent: Jul. 23, 2002

(54) POWER AND CONTROL SYSTEM FOR A MOBILE CONVEYOR SYSTEM

(76) Inventor: Charles E. West, 7120 Regency Rd., Knoxville, TN (US) 37931

( * ) Notice: Subject to any disclaimer, the term of this patent is extended or adjusted under 35 U.S.C. 154(b) by 0 days.

(21) Appl. No.: 09/570,776

(22) Filed: May 10, 2000

Related U.S. Application Data

(60) Provisional application No. 60/136,588, filed on May 28, 1999.

(51) Int. Cl.$^7$ ............................................... B65G 15/02
(52) U.S. Cl. ......................................... 198/303; 299/67
(58) Field of Search ............................. 198/303; 299/67

(56) References Cited

U.S. PATENT DOCUMENTS

| | | | | |
|---|---|---|---|---|
| 3,361,248 A | * | 1/1968 | Daymon ...................... | 198/303 |
| 4,256,213 A | * | 3/1981 | Shaw et al. .................. | 198/303 |
| 4,382,607 A | * | 5/1983 | Voight ......................... | 198/303 |
| 5,667,279 A | | 9/1997 | Christopher et al. ......... | 299/1.9 |
| 5,992,941 A | * | 11/1999 | Delli-Gatti, Jr. ............ | 198/303 |
| 6,006,894 A | * | 12/1999 | Gibbs et al. .............. | 1998/303 |

* cited by examiner

Primary Examiner—Christopher P. Ellis
Assistant Examiner—Mark A. Deuble
(74) Attorney, Agent, or Firm—Jenkens & Gilchrist

(57) ABSTRACT

A mining conveyor system that advances into a mine behind a continuous mining device. The mining conveyor system has a plurality of conveyance units connected to each other in a train-like fashion. Each conveyance unit conveys mined material to the next conveyance unit in the train until the mined material exits the mine. Each conveyance unit has a conveyance system powered by a first power source and the locomotion system is powered by a second power source. If either power source fails a switching system is utilized to power the portion(s) of the conveyance systems that lack power.

18 Claims, 3 Drawing Sheets

POWER AND CONTROL SYSTEM FOR A MOBILE CONVEYOR SYSTEM

This application claims priority of Provisional application Ser. No. 60/136,588, filed on May 28, 1999.

FIELD OF THE INVENTION

The present invention relates generally to Mobile conveyor systems and more particularly to providing power to a plurality of subsystems found on the mobile conveyor system.

DESCRIPTION OF RELATED ART

Conveyor systems have been around for many years. They are utilized in a wide variety of environments. One of the most demanding environments for a conveyor system is in the mining industry. In the mining industry, tons of rock and ore may have to be moved away from an active mining location. The rock and ore may need to be moved to a location outside of a mining hole or shaft so that it can be further processed.

In the mining industry, the active mining location is constantly moving. In many cases the active mining location moves deeper into a mine and follows a particular vein of ore. Thus, there is a need for a mechanism for transporting mined ore out of the mine via a system that both moves the ore out of the mine and can move the inby portion of the ore transporting system along with the active mining location's movement.

Furthermore, if a failure, such as a power failure, occurs on such a mobile conveyance system, it would be important that the mobile conveyance system be able to retreat from the mine.

U.S. Pat. No. 5,667,279 teaches an apparatus and method for continuous mining. The disclosed apparatus is a continuous mining system that includes a tramming conveyor. The tramming conveyor includes a continuous chain which extends the full length of the tramming conveyor. The same chain is used for both (tramming mode). A plurality of motors, spaced along the length of the tramming conveyor, motivate the single chain. Power is provided to the motors via a plurality of power buses such that a different power line powers, for example, every fourth motor. Drawbacks of this design is that the disclosed system cannot advance or retreat the conveyance system while it is in conveying mode. Furthermore, if a power bus fails to provide power, a plurality of motors along the tramming conveyor will be without power.

What is needed is a mobile conveyance system that, can provide power to all the motors powering either the conveyor portion or the mobilizing portion even if a power bus fails to provide power.

SUMMARY OF THE INVENTION

An exemplary mobile conveyance system comprises an interconnection of and mobile train of conveyance units. The train of conveyance units may trail behind a mining and loading unit. The combination of the mining and loading unit along with the mobile train can cut ore in a mining hole and deliver mined material to a transfer point outside the mining hole.

Each individual conveyance unit comprises two separate motor drive assemblies: one motor drive assembly for a conveyor system. and a second motor drive assembly for a locomotion system.

Two power cables are connected to each conveyance unit. The two power cables are connected through a switching system such that one power cable powers the conveyor motor drive assembly and the other power cable powers the locomotion motor drive assembly. If a power cable fails, the switching system can provide power from an operating power cable to the drive motor needing power.

BRIEF DESCRIPTION OF THE DRAWINGS

Various objects and advantages of this invention will become apparent and more readily appreciated from the following descriptions of the presently preferred exemplary embodiments, taken in conjunction with the accompanying drawings, of which.

DETAILED DESCRIPTION OF THE PREFERRED EXEMPLARY EMBODIMENTS

In an underground recovery mining system that is in accordance with the present invention, there exists an interconnection of mobile conveyance units forming a train of mobile conveyance units. At the head of the train of mobile conveyance units is a continuous mining and loading unit. The continuous mining and loading unit cuts and delivers mined material to the train of mobile conveyance units. The mobile conveyance units convey the mined ore from conveyance unit to conveyance unit in a sequential cascading fashion. The mined material is finally delivered to a transfer point that is preferably outside the mine. As the continuous mining and loading unit advances into a mine, the train of mobile conveyance units follow.

In an exemplary embodiment of the present mobile;conveyance system, each conveyance unit in the train includes two separate motor and drive assemblies. First, a conveyance drive motor and assembly which may include a motor drive, a conveyance chain, and/or a belt. Preferably, the conveyance drive motor is a 45 horsepower electric motor that drives the conveyance chain or belt via a mechanical single speed transmission. Secondly, there is a crawler track motor and drive assembly for driving a locomotion system such as a crawler track system or multiple wheel system. The crawler track motor is preferably a 45 horsepower electric motor which motivates the locomotion system via a hydraulic power transmission.

From time to time a failure in any one of the conveyance units may require the continuous mining system to retreat from the mining hole. Such a failure includes a power failure of any of a plurality of power cables that power any one or more motors found in the conveyance units.

An exemplary power delivery and control system is designed based on load demands, component dimensions and required reliability. The exemplary embodiment described below includes a power distribution design for a 20 conveyance unit train. The continuous mining and loading unit at the head or front of the conveyance unit train receives power from its own power cable(s) and is preferably not powered by the power cables that provide power to the mobile conveyance units.

Figure 1:
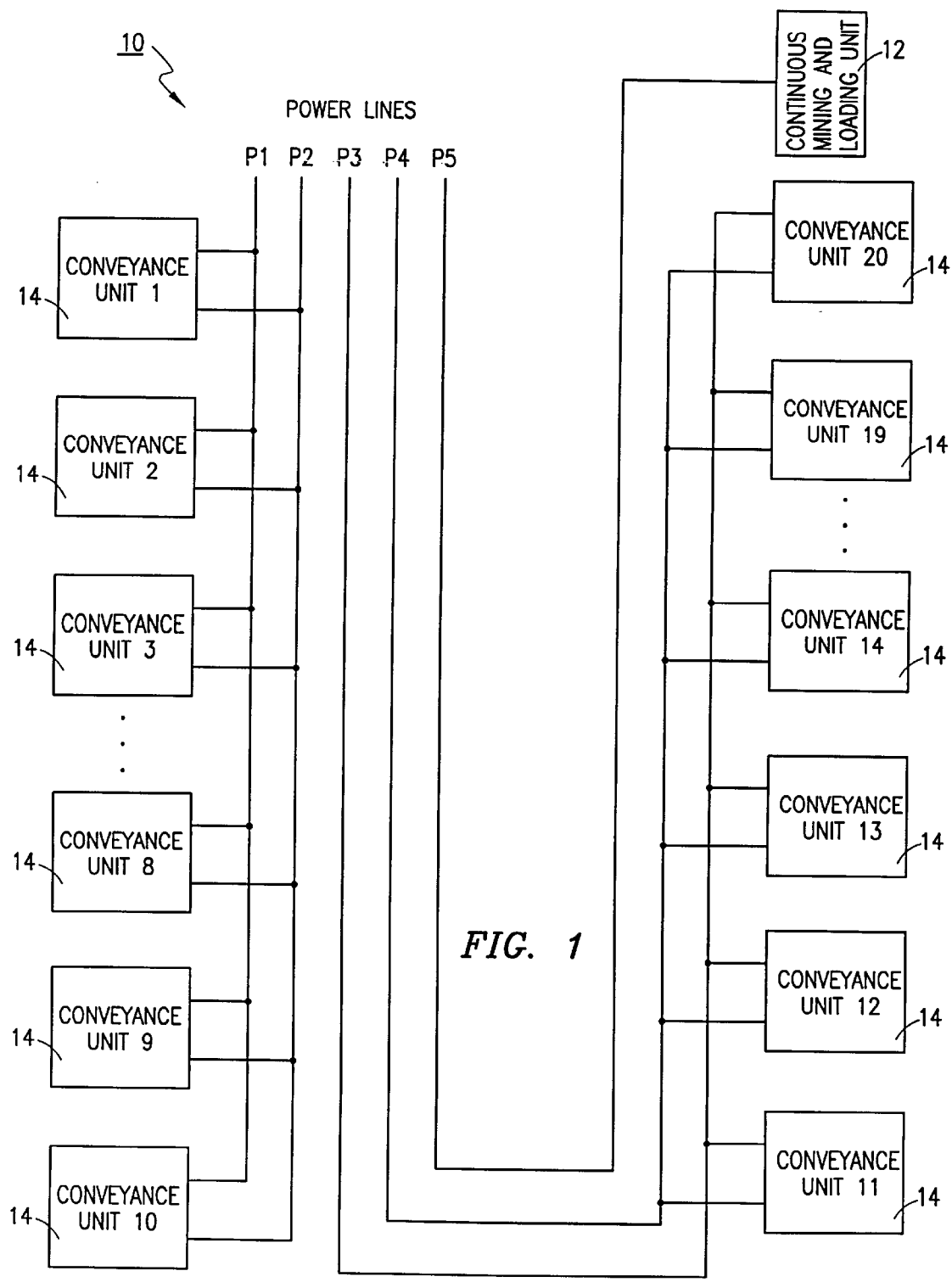
FIG. 1 depicts a block diagram of an exemplary mobile conveyance system and a plurality of power buses used to power the system.
Figure 2:
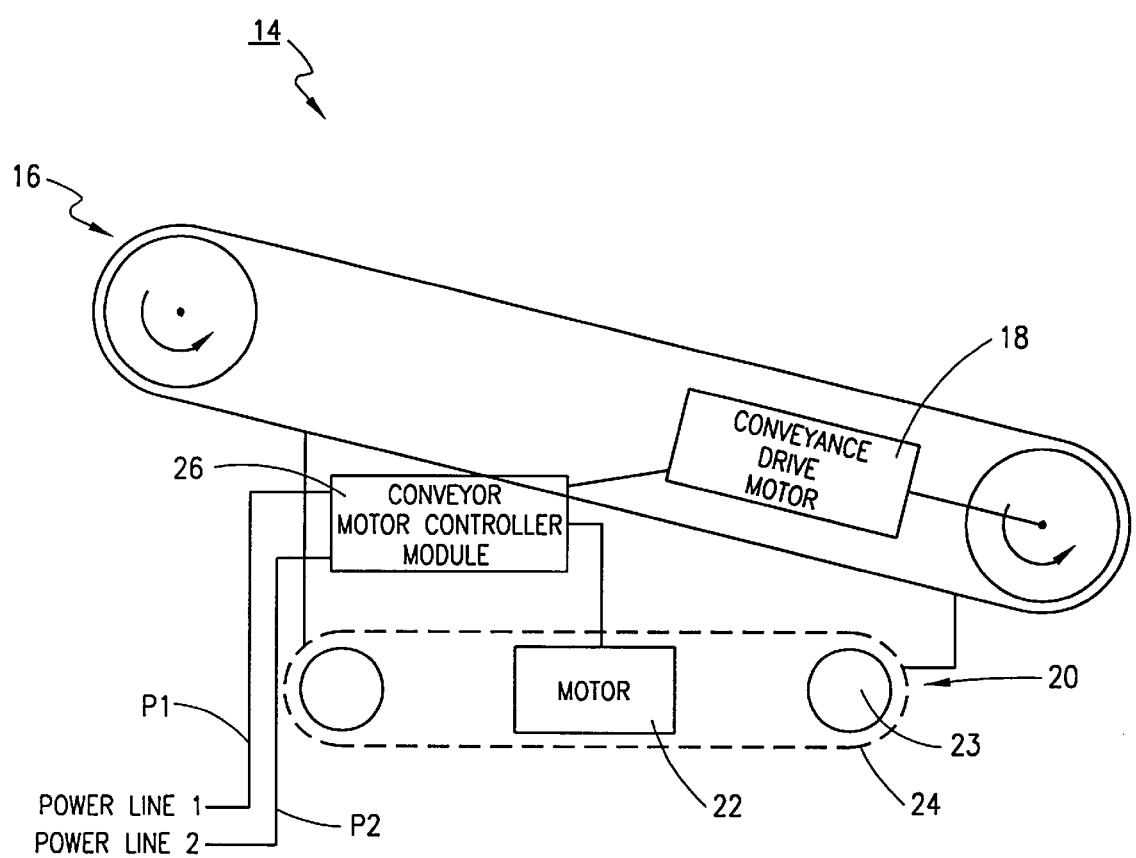
FIG. 2 depicts an exemplary conveyance unit in accordance with the present invention.

Referring now to FIGS. 1 and 2, an exemplary 20 unit mobile conveyance system and power distribution design 10 is depicted. A continuous mining and loading unit 12 is shown at the front of a train of 20 conveyance units 14. Each conveyance unit 14 is substantially similar. FIG. 2 depicts an exemplary general diagram of a conveyance unit 14 that is in accordance with the present invention. Various subsystem have been excluded from the drawing to simplify the FIG.

Each conveyance unit 14 is comprised a conveyor 16 which can be made from a variety of materials such as a chain conveyor with step portions, a belt style conveyor, etc. The conveyor 16 is preferably a continuous chain with steps (not shown). The conveyor is motivated preferably by a conveyance drive motor 18 and a mechanical single speed transmission.

Each conveyance unit 14 further comprises a locomotion system 20 for mobilizing the conveyance unit 14. The locomotion system 20 may include an electric locomotion motor 22. The locomotion motor 22 may be connected via a transmission to wheels 23 or a crawler track system 24.

Both the conveyance drive motor 18 and the locomotion motor 22 receive power via a conveyor motor controller unit 26. The conveyor motor control unit is connected to at least two power lines P1 and P2.

Figure 3:
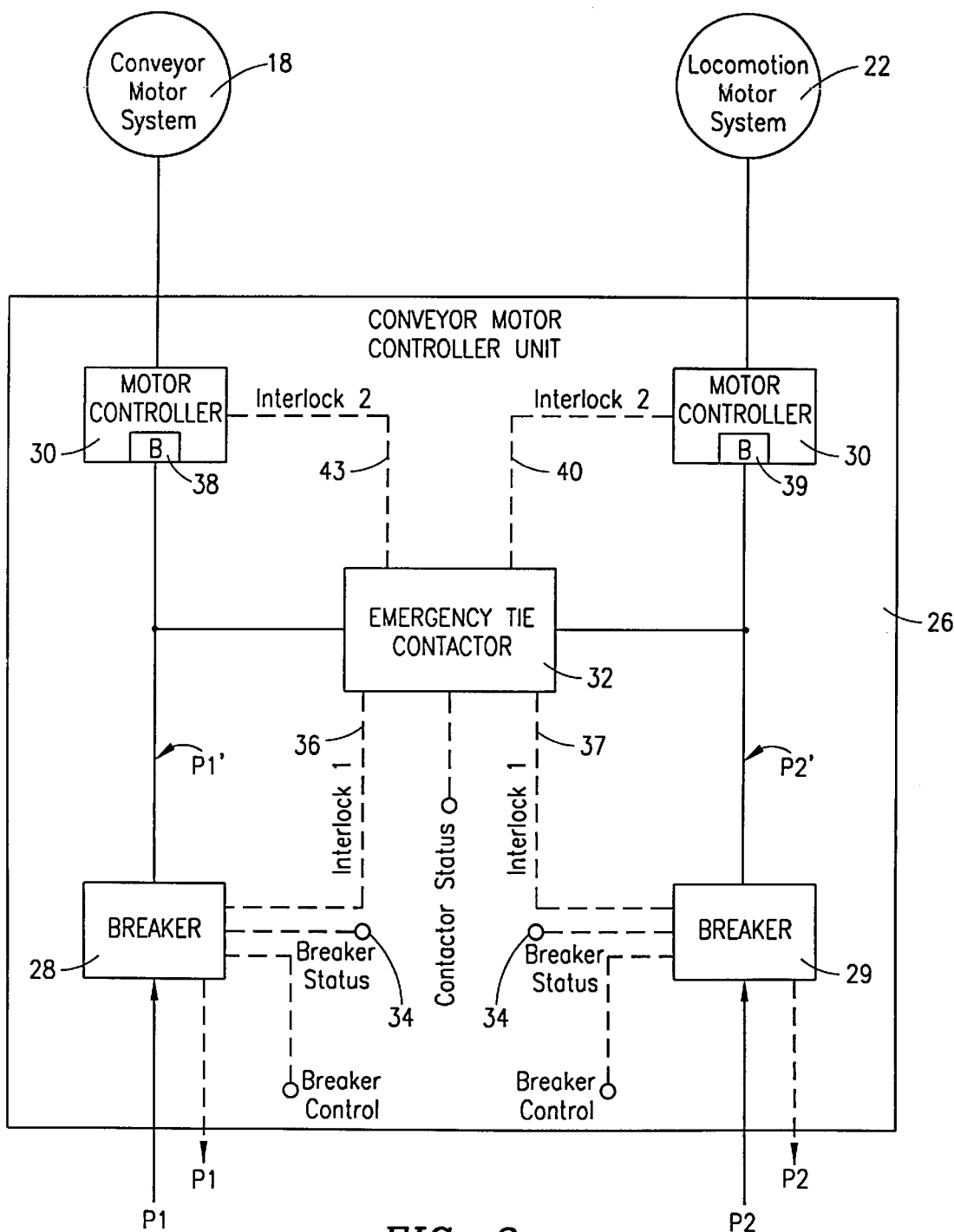
FIG. 3 depicts a block diagram of an exemplary motor controller module and power switching system in accordance with the present invention.

FIG. 3 depicts an exemplary conveyor motor controller unit 26 that is in accordance with the present invention. Power lines P1 and P2 are connected to the controller unit 26. Each power line P1 and P2 connects to a separate breaker 28 and 29. From the breakers 28 and 29, each power line P1 and P2 is provided to a motor controller circuit 30. The motor controller circuits 30 control the electrical power to the conveyor motor system 18 or the locomotion motor system 22. The motor controller circuits 30 are separately controlled by an operator via a control signal (not shown). The exemplary conveyance unit 14 can operate so that it can convey materials on the conveyor via the conveyance motor system 18 while moving via the locomotion system 22.

The conveyance system 10 passes mined material from conveyance unit to conveyance unit, preferably, in a cascading style conveyance technique. Referring now to FIGS. 1, 2 and 3, the preferred electrical power distribution and control is described.

The exemplary 20-unit conveyance train is preferably connected to four power cables P1, P2, P3, and P4. Each conveyance unit is connected to two separate power cables. For example, conveyance unit 1 is connected to power lines P1 and P2. Each of the four power lines may loop in and out of nine conveyance units (see dotted lines of FIG. 3) and then be terminated into a tenth conveyance unit. It is preferable that the power lines P1–P4 are each connected to ten sequential conveyance units as shown in FIG. 1, but this is not required. Preferably, two power cables (P1 and P3) are dedicated to two sequential series of conveyor drive motors and two power cables (P2 and P4) are dedicated to two sequential series of locomotion motors.

Two separate power supply cables (P1 and P2), serving a conveyance unit 14, each terminate into a separate circuit breaker 28 and 29. On the other side of the circuit breakers (the load side), the two power supply cables continue as P1' and P2' and can be connected together by an emergency tie contactor 32. The emergency tie contactor is essentially a switch that can be closed to connect the two circuits P1' and P2'. The purpose of the emergency tie (or power) contactor 32 is to provide an alternate source of power to either the conveyor motor 18 or the locomotion motor 22 if a power failure situation occurs.

If one of the power cables fails to provide power to the mobile conveyor system, there would be a need to unload the mobile conveyance system 10 and then retreat the system 10 from the mine. Thus, the emergency power contactor 32 can be remotely controlled by an operator in order to provide power for orderly unloading and retreat from the mine hole in the event that one of the power cables failed. Controls of the emergency power contactor 32 are arranged with electrical interlocks and further may require an operator's interaction to initiate the retreat procedure from the mine under emergency power conditions. Alternate power switching provided by the emergency tie contactor 32 is generally only to be utilized when there is a failure of one of the power lines (P1–P4) to the conveyance train and its motors.

Failure of any one of the four power cables P1 through P4 will result in a loss of power to either a plurality of the conveyor drive motors. 18 or a plurality of the locomotion motors 22. If a loss of power occurs in any of the four cables, the mining operation will stop. A system status output will report the power failure condition to an operator's interface panel. A plurality of failure conditions may occur. Below two exemplary conditions are described.

A first possible failure is a power failure of a power line that provides power to one or more of the conveyor motors. Control interlocks will stop the mining operation and status of the power failure will be displayed at an operator station. An operator will evaluate and confirm the failure condition and begin a procedure for withdrawing the mobile conveyance system from the mine. The operator will remotely trip and confirm via breaker status signal lines 34 that the circuit breakers for the failed power line to a series of, for example, ten conveyance units are placed into a locked, open position. Furthermore, auxiliary contacts 36 on the circuit breaker 28 connect to the emergency tie contactor 32 and provide an interlock signal so that the emergency tie contactor cannot close unless the breaker 28 is open.

Next, a contactor 39 found in the motor controller circuitry 30 for the locomotion motor system 22 is switched open for the series of ten conveyance units (1–10). An interlock signal 40 is provided to the contactor 32 will prevent the tie contactor from switching until the contactor 39 is open.

The emergency tie-contactor 32 is then switched to a closed position such that power from the P2 power cable is routed to the conveyor motor system 18 via the tie contactor 32. The conveyance system can then be operated under power to unload all the ore on the conveyance route. Once the ore is unloaded, the emergency tie contactor 32 connection is opened and the contactor 39 is enabled to provide power to the locomotion motors so that the mobile conveyor can be retreated from the mine. Interlocks 36, 37, 40, and 43 are provided to prevent switching from taking place at times that may cause shorts in the circuits or prevent power from being provided to an incorrect destination.

A second failure condition exists if power to the locomotion motors 22 fails on, for example, the P2 power line. When a power failure to the locomotion system occurs, control interlocks will stop the mining operation and status will be displayed at an operator's station. The operator will evaluate and confirm the failed power condition and begin a procedure to withdraw the mobile conveyance train from the mine.

Since power, in this second failure situation, failed on the locomotion portion of at least a few of the conveyance units, the conveyance motors will still be operational. Thus, the operator will have the conveyance systems of the mobile conveyance units unload the mined ore still on the conveyance route.

Next, the circuit breakers 29 (for the failed power cable P2 of the plurality of conveyance units 14 connected to the power cable P2) are switched to an open position. Auxiliary contacts on this circuit breaker 29 are interlocked with the emergency tie contactor 32 to prevent the emergency tie contactor 32 from switching to a closed position before the breaker 29 was locked open.

The contractors 38 in the plurality of conveyance units are switched to an open position to isolate the conveyance motors from the operational P1 powerline. An interlock 43 line provides an interlock signal to the emergency tie contactor 32 to prevent the tie contactor from switching until the contactor 38 is open.

The emergency tie contactor 32 can then be closed so power from the P1 power line can be provided via the tie contactor 32 to the locomotion motor system 22. The mobile conveyance system can then be retreated from the mine.

It is understood that preferably the power cables are connected to a series of conveyance units 14 that are next to each other, but the connection could be to every other, every third or other configuration. It is important, though, that all P1 power lines power, for example, only conveyance motors so that switching of the emergency tie contactor during a power failure is not confusing or renders the system unoperational.

Although various preferred embodiments of the invention have been shown and described, it will be appreciated by those skilled in the art that changes may be made to these embodiments without departing from the spirit of the invention.

What is claimed is:

1. A mobile conveyor system comprising:
   a plurality of conveyance units linked, to each other in a train like fashion, each of said plurality of conveyance units comprising:
   a locomotion system for moving the conveyance unit forward and backward;
   a conveyance system for transferring material across the conveyance unit,
   a conveyor motor control unit connected to said locomotion system and to said conveyance system;
   a first power line connection associated with said conveyor motor control unit for connecting electrical power to said locomotion system via said conveyor motor control unit; and
   a second power line connection associated with said conveyor motor control unit for connecting electrical power to said conveyance system via said conveyor motor control unit wherein said conveyor motor control unit comprises a contactor for connecting said first power line connection to said conveyance system if a power failure occurs on said second power line connection.

2. The mobile conveyor system of claim 1, wherein said contactor is further for connecting said second power line connection to said locomotion system if a power failure occurs on said first power line connection.

3. The mobile conveyor system of claim 1, wherein a first power line is connected to said first power line connection of a first predetermined plurality of said conveyance units and a second power line is connected to said second power line connection of said first predetermined plurality of said conveyance units.

4. The mobile conveyor system of claim 1, wherein said conveyance system comprises:
   an electric motor connected to said conveyor motor control unit;
   a transmission connected to said motor; and
   a conveyor connected to said transmission, said conveyor being for moving material across the conveyor unit.

5. The mobile conveyor system of claim 1, wherein said locomotion system comprises:
   an electric motor connected to said conveyor motor control unit;
   a transmission connected to said electric motor; and
   a plurality of wheels connected to said transmission, said plurality of wheels being for motivating said conveyance unit in a forward or backward direction.

6. The mobile conveyor system of claim 5, Wherein said plurality of wheels are associated with a crawler track system.

7. The mobile conveyor system of claim 1, further comprising a continuous mining unit positioned at the front of said mobile conveyor system, said continuous mining unit being for mining ore and loading the. mined ore onto a first conveyance unit, said first conveyance unit being one of said plurality of conveyance units.

8. A mobile conveyance unit for use in a train of mobile conveyance units, said mobile conveyance unit comprising:
   a conveyance system for moving material across said mobile conveyance unit;
   a locomotion system for moving said mobile conveyance unit forward and backward;
   a motor controller system connected to said conveyance system and to said locomotion system, said motor controller system for controlling at least power being provided to said conveyance system and to said locomotion system;
   a first power line connection to said motor controller system, said first power line connection being for providing power to said conveyance system; and
   a second power line connection to said motor controller system, said second power line connection being for providing power to said locomotion system; and
   a contactor, selectively connected to said first and second power line connections, for selectively providing power to at least one of said conveyance system and said locomotion system in the case of a power failure.

9. The mobile conveyance unit of claim 8, wherein said conveyance system comprises:
   a conveyor;
   a transmission connected to said conveyor; and
   a motor connected to said transmission.

10. The mobile conveyance unit of claim 8, wherein said locomotion system comprises:
    a set of wheels;
    a transmission for motivating at least one of said set of wheels; and
    a motor connected to said transmission.

11. The mobile conveyance unit of claim 8, wherein said motor controller system is adapted to be operated remotely by an operator such that said contactor is adapted to provide power from said first power line connection to said locomotion system when said second power line connection is not receiving power.

12. The mobile conveyance unit of claim 8, wherein said motor controller system is adapted to be operated remotely by an operator such that said contactor is adapted to provide power line from said second power connection to said conveyance system when said first power line connection is not receiving power.

13. A mining conveyor system adapted to follow a continuous mining unit into a mine, said mining conveyor system comprising a plurality of conveyance units in a train-like configuration for conveying mined material away from said continuous mining unit, each said conveyance unit comprising:

a conveyance system for moving material across each said mobile conveyance unit;

a locomotion system for moving each said conveyance unit forward and backward in conjunction with the other conveyance units in said train-like configuration;

a motor controller system connected to said conveyance system and to said locomotion system, said motor controller-system for controlling at least power being provided to said conveyance system and to said locomotion system;

a first power line connection to said motor controller system, said first power line connection being for providing power to said conveyance system;

a second power line connection to said motor controller system, said second power line connection being for providing power to said locomotion system; and a contactor, associated with said motor controller system, said contactor adapted to connect said first power line connection so that power can be provided from said first power line connection to said locomotion system if a power failure occurs on said second power line connection.

14. The mining conveyor system of claim 13, wherein said motor controller system comprises means for switching power from said first power line connection to said locomotion system when said second power line connection fails.

15. The mining conveyor system of claim 13, wherein said motor controller system comprises means for switching power from said second power line, connection to said conveyance system when said first power line connection fails.

16. The mining conveyor system of claim 13, being adapted to retreat from a mine when there is a power failure associated with one of said first power line connection and said second power line connection.

17. The mining conveyor system of claim 13, wherein said locomotion system comprises an electric motor and a crawler track, system.

18. The mining conveyor system of claim 13, wherein a first power line is connected to the first power line connection of each of said plurality of conveyance units and a second power line is connected to the second power line connection of each of said plurality of conveyance units.

* * * * *

UNITED STATES PATENT AND TRADEMARK OFFICE
CERTIFICATE OF CORRECTION

PATENT NO.    : 6,422,374 B1
DATED         : July 23, 2002
INVENTOR(S)   : Charles E. West It is certified that error appears in the above-identified patent and that said Letters Patent is hereby corrected as shown below:

Column 1,
Lines 39-40, replace "The same chain is used for both (tramming mode)." with -- The same chain is used for both conveying coil (conveying mode) and tramming the system along the floor of the mine (tramming mode). --
Line 50, replace "system that, can" with -- system that can --
Line 66, replace "system. and a second motor" with -- system and a second motor --

Column 2,
Line 40, replace "present mobile;" with -- present mobile --

Column 4,
Line 18, replace "drive motors. 18" with -- drive motors 18 --

Column 5,
Line 11, replace "The contractors 38" with -- The contactors 38 --
Line 36, replace "units linked, to each" with -- units linked to each --
Line 43, replace "the conveyance unit," with -- the conveyance unit; --

Column 6,
Line 17, replace "claim 5, Wherein" with -- claim 5, wherein --

Column 8,
Line 12, replace "second power line, connection" with -- second power line connection --

UNITED STATES PATENT AND TRADEMARK OFFICE
CERTIFICATE OF CORRECTION

PATENT NO.    : 6,422,374 B1
DATED         : July 23, 2002
INVENTOR(S)   : Charles E. West It is certified that error appears in the above-identified patent and that said Letters Patent is hereby corrected as shown below:

<u>Column 18,</u>
Line 22, replace "track, system" with -- track system --

Signed and Sealed this

Fifth Day of November, 2002

Attest:

Attesting Officer

JAMES E. ROGAN
*Director of the United States Patent and Trademark Office*